US006059142A

United States Patent [19]

Wittern, Jr. et al.

[11] Patent Number: 6,059,142

[45] Date of Patent: May 9, 2000

[54] APPARATUS AND METHOD FOR VENDING MULTIPLE PRODUCTS

[75] Inventors: Francis A. Wittern, Jr., West Des Moines; Roger L. Wilson, Urbandale, both of Iowa

[73] Assignee: Inland Finance Company, Des Moines, Iowa

[21] Appl. No.: 09/259,538

[22] Filed: Mar. 1, 1999

Related U.S. Application Data

[63] Continuation of application No. 09/172,914, Oct. 15, 1998, abandoned.

[51] Int. Cl.[7] .......... B65G 59/00

[52] U.S. Cl. .......... 221/1; 221/93; 364/479.08

[58] Field of Search .......... 221/1, 9, 92, 93, 221/94, 112; 364/479.11, 479.08, 479.03

[56] References Cited

U.S. PATENT DOCUMENTS

| | | | |
|---|---|---|---|
| 4,034,839 | 7/1977 | Lee | 364/479.08 |
| 4,282,575 | 8/1981 | Hoskinson et al. | 364/479.08 |

*Primary Examiner*—Kenneth W. Noland
*Attorney, Agent, or Firm*—Henderson & Sturm LLP

[57] ABSTRACT

A vending apparatus for and method of vending multiple products includes a master vending machine which utilizes money handling and changing components as well as a selection component and controller. The present invention may also include one or more satellite machines. The satellite vending machine utilizes the money handling components and the selection control components of the master vending machine. The selection component used by the master vending machine alone or in combination with one or more satellite vending machines is utilized to implement special combination pricing for selected combination purchase.

20 Claims, 1 Drawing Sheet

APPARATUS AND METHOD FOR VENDING MULTIPLE PRODUCTS

CROSS-REFERENCE TO RELATED APPLICATIONS

This application is a Continuation Application of U.S. patent application Ser. No. 09/172,914, filed Oct. 15, 1998, now abandoned entitled "Apparatus and Method for Vending Multiple Products," the disclosure of which is hereby incorporated by reference in its entirety.

STATEMENT REGARDING FEDERALLY SPONSORED RESEARCH OR DEVELOPMENT

Not Applicable.

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to vending machines and more particularly to vending machines which allow for special combination pricing for multiple product purchases including multiple vending machines linked to one another by a common money-handler and/or product selection control.

2. Description of the Related Art

Vending machines today dispense a wide variety of products. Examples are soft drinks in cans or bottles, candy, sandwiches, snacks, fruit, yogurt, toys, merchandise and tokens. Numerous other examples exist as well.

The structure and operation of vending machines continue to evolve to attempt to provide for the efficient and effective vending of such items. For example, there are different types of vending mechanisms, such as a vertical drop-type machine used many times with beverage cans, carousel-type machines used many times with food, and spiral delivery-type machines used many times with candy or smaller items.

Improvements and innovations continue regarding making the structure and mechanisms of individual machines better. Also, mechanisms to handle payment for the goods have changed and continue to advance. Such mechanisms can receive coins and bills, and even debit cards and credit cards.

While much effort has gone into improving individual machines, there has been very little attention focused on multiple vends including the use of multiple vending machines interacting with one another. Advances in the electrical and computer arts, which allow microprocessor or electronic controllers to reliably control the operation of vending machines, now make it possible to control multiple vending machines with a single controller.

For example, sometimes it is desirable to have more than one vending machine in certain locations. Many times this is because of inherent limitations of most vending machines; they cannot exceed a certain size and, therefore, one machine cannot have unlimited inventory or selections. Also, some companies either own proprietary vending machines or require only its products in the machine. It is, therefore, not uncommon to see several vending machines side by side. Many times it is to provide the pubic selections of the same goods (e.g., soft drinks) from different companies. Thus, multiple machines may be needed.

Other situations have a variety of machines in the same location for more practical purposes. For example, many companies provide a break room or area with a variety of selections of snacks or beverages, such as fruit, candy, chips, soft drinks, juice, coffee, tea, bottled water, etc. Sometimes, what formerly was a cafeteria has been replaced with vending machines offering food including sandwiches, soaps, microwavable lunches, etc. Again, multiple machines are necessary because some require different functions, e.g., pouring hot beverages into an insulated cup versus providing a plurality of refrigerated food selections to the customer. As another alternative, the same factors can lead to a wider variety of product types being vended from a single machine. However, this results in less variety of each type of product.

Normally, each machine is built as a stand-alone, with its own money handling and selection system. Even machines made by the same vending machine manufacturer are normally made to be stand alone so that they can be used alone or alongside others, without having to rely on the operation components of other machines. There is also generally no incentive for competing manufacturers to make their machines in any way compatible with other manufacturers machines.

In an increasingly competitive market, such innovations have occurred. Attempts have been made to produce vending machines that are more desirable by business entities that buy vending machines and, thus, increase business for the machine manufacturers. Attempts have also been made to present products in a way that increase consumer selection of those products and, thus, increase the profitability of the companies that make and/or sell the products.

One of these innovations is the packaging of vendable goods in more attractive or attention grabbing containers, including a much wider variety of container shapes and styles. Beverages, mostly carbonated soft drinks, first were vended in glass bottles. Aluminum cans substantially replaced the bottles. However, today there has been a proliferation of not only different manufacturers of soft drinks, but also of different types of drinks. For example, bottled water, carbonated or not, is a popular consumer item. Juices and sports drinks also can be found in numerous brand names. Hybrid drinks, such as flavored ice tea or mixed juices, are also popular.

Previously, the limited numbers of types of drinks and manufacturers of drinks resulted in standard container sizes and configurations. Cylindrical standard sized aluminum can were the containers of choice. Vending machines were structurally configured to hold as many of the cans as possible, without much regard for allowing consumer to view the containers. The consumers knew all the container shapes were the same, therefore, they distinguished the vendable products primarily by brand name, logo, or colors. Thus, the vending machines could display many times in a relatively small area, the brand name, logo and/or colors for different choices.

However, today manufacturers may use different container sizes and configurations in addition to any of a wide variety of label types or container ornamentation to try to differentiate themselves from competitors. Some types of beverages tend to be bottled in similar types of containers to differentiate beverage type, but again labeling, surface ornamentation, and/or container configuration is used to differentiate the brands. Examples are the new thirty-two ounce soft drink bottles adapted by some manufacturers, the almost uniform use of clear glass for ice tea and juice-based drinks, and a variety of bottle configurations for bottled and flavored water. Cans remain the primary soft drink container, but unique and constantly changing labeling, ornamentation, and configurations are used and advertised again to try to grab and keep consumer attention. Thus, the consumer is presented with a wide range of product packaging configurations and ornamentation with respect to bendable items, as opposed to the past where no more than several package configurations were generally available.

Another one of those innovations is to utilize what will be called live displays of the produce in the machine. As is known, most can or bottle vending machines do not have actual physical examples of the products stored in the machine on display. It is generally assumed that the consuming public does not need to see the actual can or bottle or other container, but can rely on the brand name or logo displayed on the selection controller or otherwise on the machine. However, it has been practiced for years that to increase consumer demand for candy or other food that physical display of the actual product be made. This is most times done by revealing to the consumer the actual products as they sit in the display rack or in a dispensing mechanism by having windows that allow such viewing.

To date, vending machine companies have focused their attention on marketing advantages which can be derived from linking multiple vending machines together as well as improving the display and user interface. However, additional potential marketing benefits also exist. For example, implementation of special combination pricing for combination purchases or multiple purchases can be realized with both single and linked vending machines. Therefore, there is a need for an improved apparatus for and method of vending multiple products from single and linked vending machines which realizes the above-stated advantage.

Those concerned with these and other problems recognize the need for an improved apparatus and method for vending multiple products.

BRIEF SUMMARY OF THE INVENTION

The present invention relates generally to vending machines and additionally relates to linked vending machines which provide special combination pricing for combination purchases. The apparatus includes a host vending machine that contains product to be vended, a money handling controller and a product selection controller which controls the eligibility of a consumer to receive vending product and the dispensing of selected product to the consumer. The present invention also may include one or more satellite machines, positioned adjacent or in close proximity to the host machine, whereon the satellite machines typically vend a product of a type different than the product vended by the host machine. In the embodiment including one or more satellite vending machines, the host vending machine money handling controller and product selection controller are used by the satellite machines.

Each vending machine, whether host or satellite, include mechanisms for dispensing product. The mechanisms for dispensing product are activated by the product selection controller in the host machine. The satellite machines do not include a money handling controller or a product selection controller. Common control of the host vending machine alone or in combination with one or more satellite vending machine allows for the realization of numerous competitive and economic advantages.

The method of the invention includes utilizing a single controller system for a host vending machine operating alone or in combination with one or more satellite vending machines near a host machine. The single control system in the host machine includes a money handling controller and a product selection controller which controls the eligibility of a consumer to receive vended product, and controlling the product vending mechanisms of the host machines by the single selection controller of the host machine.

In both the method and apparatus of the present invention, the common money handling controller and product selection controller can be used to implement special combination pricing for selected combination purchases.

It is therefore a primary object of the present invention to provide an apparatus and method for vending multiple products from one or more vending machines which allow for special combination pricing for combination purchases.

It is further an object of the present invention to provide an apparatus and method for configuring multiple connected vending machines which utilize a common product selection controller for controlling the dispensing mechanisms of each vending machines.

A further object of the present invention is to provide an apparatus and method for configuring multiple connected vending machines which increase consumer purchases of vended items in the host and satellite machines.

A still further object of the present invention is to provide an apparatus and method for vending multiple products which promote cross-selling of products in the host and satellite machines.

A still further object of the present invention is to provide an apparatus and method for vending multiple products from one or more vending machines which does not require major modification of conventional vending machine configurations.

These and other objects features and advantages of the present invention will become more apparent with reference to the accompanying specification and claims.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
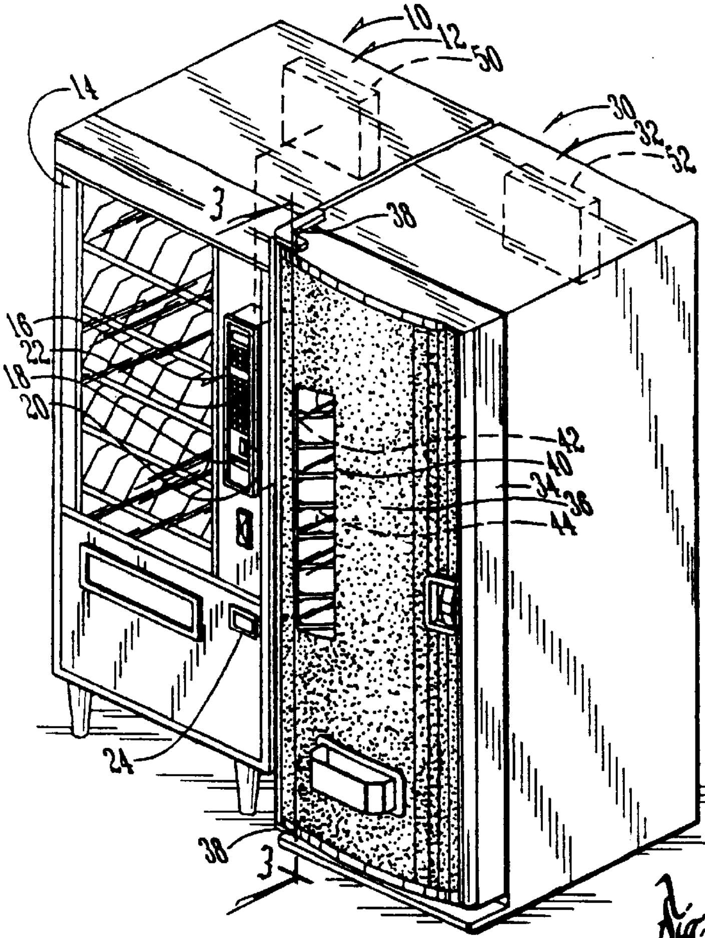
FIG. 1 is a perspective view of host and satellite vending machines according to the present invention.

To assist in the understanding of the invention, a detailed description of one embodiment according to the invention will now be set forth. The drawings accompanying this description will be frequently referenced. Reference numerals and/or letters will be used to point out certain parts and locations in the drawings unless otherwise indicated.

FIG. 1 illustrates a vending machine (10) having a housing (12) which basically defines an enclosure. Housing (12) prevents access to either money or vendible products by an unauthorized person. The front side (14) of housing (12) includes a display panel (16) and what will be called collectively the user interface. Specifically the user interface in this example consists of a bill changer (18), a coin or token receiver (20), a selection panel (22), and a coin return (24). As can be seen, each of the elements of the user interface are spaced apart along the right margin of front side (14) of machine (10).

In this embodiment, the machine (10) is a vending machine of the type usually used to vend food products such as candy, gum, chips, cookies, crackers and other snacks. Display (16) allows the customer to view the actual products inside the machine. Machine (10) is here referred to as the host or master vending machine because it contains the selection and control components as well as the money or token handling equipment.

FIG. 1 also illustrates what will be referred to as the satellite vending machine (30). Machine (30) includes a housing (32) and a front door (34) that is hinged to housing (32) by hinges (38) along the left side vertical edge of door (34).

Figure 2:
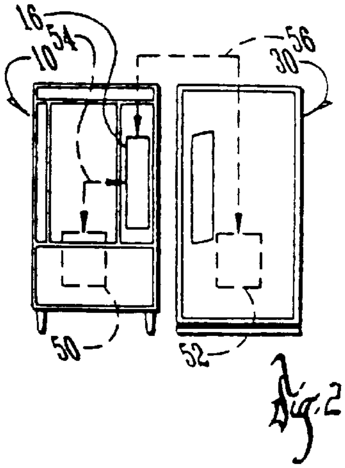
FIG. 2 is a diagrammatic depiction of the operative interconnection between the host and satellite vending machines of FIG. 1.
Figure 3:
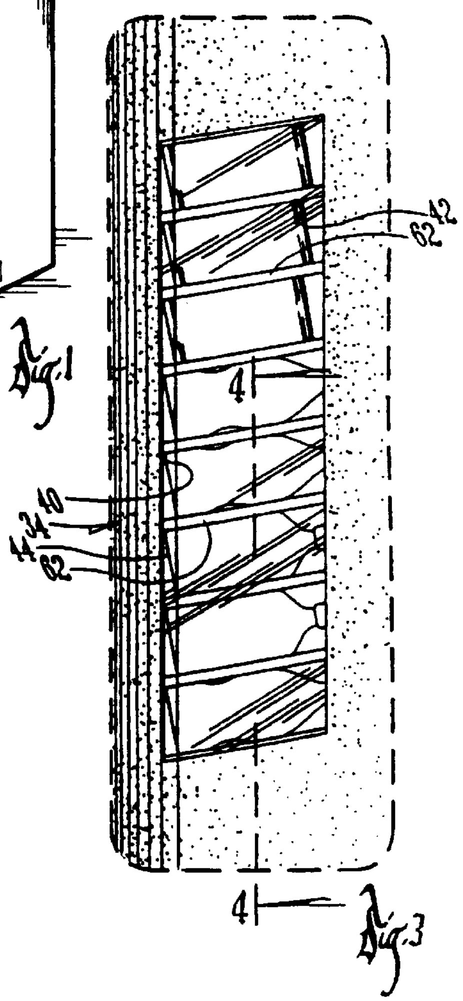
FIG. 3 is an enlarged isolated front elevational view of the line display of the satellite vending machine.

The satellite machine (30) does not include a money/token handler or a selection control. As illustrated diagrammatically in FIG. 2, each machine (10) and (30) has a dispensing mechanism, indicated at (50) and (52) respectively. These dispensing mechanisms can take on a wide variety of configurations and types, as is well known in the art. Some have been discussed generally in the Background of the Invention above. For example, while a snack and a beverage machine has been discussed, the present invention also applies to the combinations of two or more vending machines which vend a multitude of products and product types.

By means known in the art, the control circuitry of host machine (10) is electrically connected by cable(s) (56) to dispensing mechanism (50), and by cable(s) (56) to dispensing mechanism (52). A single controller is capable of controlling the operation of both machine (10) and machine (30). This is also as is known and practiced in the art, and will not be explained in detail.

Figure 4:
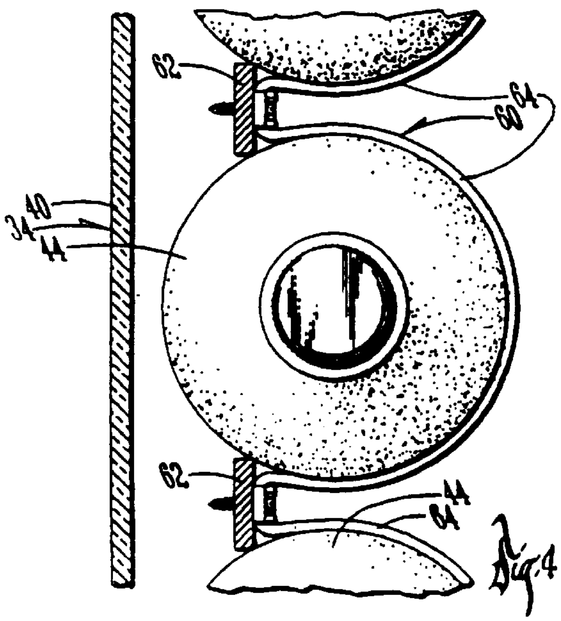
FIG. 4 is an enlarged sectional view of the rear of the door of the satellite vending machine of FIG. 1 taken in the direction of lines 4—4 of FIG. 3 illustrating a display rack for live examples of product that can be viewed through the live display window in the front of the satellite machines.

Satellite machine (30) as shown in FIG. 1 for exemplary purposes includes a live display window (40) at or near the left side of machine (30). In FIG. 1 window (40) is elongated vertically. By referring also to FIG. 4, the inside (62) of door (34) includes a display rack (60) which is generally aligned with window (40). Rack (60) includes trays or carriers onto which can be placed and retained examples of products that can be vended by satellite machine (30). Rack (60) can take a variety of different configurations. One example is made of a plurality of aluminum trays (64), each tray holding one container, such as a can (42) or bottle (44), as indicated in FIG. 1. Trays (64) can optionally be slanted so that the containers will be held by gravity in position, but can be easily accessed and removed and/or replaced.

It will be appreciated that the present invention can take many forms and embodiments. The true essence and spirit of this invention are defined in the appended claims, and it is not intended that the embodiment of the invention presented herein should limit the scope thereof.

For example, host machine (10), including the operating components, can be the SnackMart IIIA available from USI U-Select-It, Des Moines, Iowa or an LCM machine from Automatic Products of St. Paul, Minn. Satellite machine (30) can be a USI BVI machine. In this example, the host machine would vend snacks and the satellite would vend different beverages, with the live display of the satellite machine at the left side adjacent or near the selection and money handling devices. The customer, by standing near the selection and money handling devices, can view the live displays of both machines and physically insert money and select products from both machines without any significant movement from that position.

In the present invention, single controller controlling the dispensing of product is used to implement a special combination pricing scheme when a consumer purchases certain multiple product combinations. The combination pricing allows the consumer to select certain product combinations which can be purchased at a cost which is less than if the products were purchased separately. As discussed above, the present invention works equally well with a single vending machine or in a system utilizing a master vending machine and one or more slaved vending machines. Since the multiple machine system utilizes a single controller to control all of the product dispensing, special combination pricing for multiple product purchases from different machines can be realized. Special combination pricing makes cross-selling easier and more likely.

The combinations eligible for special pricing are programmed into the controller. The combinations can take a variety of forms and can be implemented in a variety of ways. In one scenario, a special combination price might be available for a consumer who selects a sandwich product, a chip product and a beverage product. In this example, three vending machines would most likely be linked. Obviously, combinations could involve product combinations other than three products.

In another scenario, the special combination pricing might be used to promote selection of products from the same company. Thus, by way of example, if a consumer selects a beverage and snack product from the same company, a special combination price will apply but no discount will be given if the products are from different companies. In still another scenario, a special combination price might apply by selection of a certain product or by selection of a product from a certain company. For example, suppose a company wishes to promote a new beverage product, or its beverage products generally, the company might subsidize a special price for any other vend item in the linked vending machine group. A consumer selecting the particular product or company product line would receive a special combination price if it buys another product such as a sandwich or snack item.

Although only exemplary embodiments of the present invention have been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A vending machine apparatus, comprising:

a master vending machine, said master vending machine including a user interface for receiving bills, coins or tokens and for making product selections, a control mechanism and a dispensing mechanism for dispensing selected product from inside the master vending machine;

wherein said control mechanism is operatively connected to said user interface;

wherein said control mechanism is operatively connected to said dispensing mechanism for dispensing selected product; and wherein said control mechanism includes means for dispensing multiple products selected by the user at a special combination pricing.

2. The vending machine apparatus of claim 1 wherein said special combination pricing applies to a group of one or more specific combinations.

3. The vending machine apparatus of claim 2 wherein said specific combinations are determined by type of product.

4. The vending machine apparatus of claim 2 wherein said specific combinations are determined by brand of product.

5. The vending machine apparatus of claim 2 wherein said specific combinations are determined by brand and type of product.

6. The vending machine apparatus of claim 2 wherein said specific combinations are determined by the selection of a particular product.

7. The vending machine apparatus of claim 2 wherein said specific combinations are determined by selection of the same type of product.

8. The vending machine apparatus of claim 2 wherein said specific combinations are determined by a repeated selection of a particular product.

9. The vending machine apparatus of claim 1, including:

one or more satellite vending machine, each of said satellite vending machines including a product dispensing means;

wherein said control mechanism of said master vending machine is operatively connected to said dispensing mechanism for each of said one or more satellite vending machines whereby said dispensing of multiple products can occur on one or more of said master vending machine and said one or more satellite vending machines.

10. The vending machine apparatus of claim 9 wherein said special combination pricing applies to a group of one or more specific combinations.

11. The vending machine apparatus of claim 10 wherein said specific combinations are determined by type of product.

12. The vending machine apparatus of claim 10 wherein said specific combinations are determined by brand of product.

13. The vending machine apparatus of claim 10 wherein said specific combinations are determined by brand and type of product.

14. The vending machine apparatus of claim 10 wherein said specific combinations are determined by the selection of a particular product.

15. The vending machine apparatus of claim 10 wherein said specific combinations are determined by selection of the same type of product.

16. The vending machine apparatus of claim 10 wherein said specific combinations are determined by a repeated selection of a particular product.

17. The vending machine apparatus of claim 10 wherein said specific combinations arc determined by selection of at least one product from said master vending machine and selection of one product from said one or more satellite vending machines.

18. The vending machine apparatus of claim 10 wherein said specific combinations are determined by selection of at least two products, said two products being selected from different vending machines.

19. A method of vending products from a vending machine, said vending machine including a user interface for receiving bills, coins or tokens and for making product selections, a control mechanism and a dispensing mechanism for dispensing selected product from inside the vending machine, said control mechanism being operatively connected to said user interface, and said control mechanism being operatively connected to said dispensing mechanism for dispensing selected product; comprising the steps of:

allowing a user to accumulate a credit by insertion of a combination of at least one or more of bills, coins and tokens into said user interface;

enabling the control mechanism to permit a user to make multiple selections; and dispensing the multiple product selections at a special combination price.

20. A method of vending products from a master vending machine and one or more satellite vending machines, said master vending machine including a user interface for receiving bills, coins or tokens and for making product selections, a control mechanism and a dispensing mechanism for dispensing selected product from inside the master vending machine, each of said satellite vending machines including a dispensing mechanism for dispensing selected product, said control mechanism being operatively connected to said user interface, said control mechanism being operatively connected to said dispensing mechanism for said master vending machine, and said control mechanism being operatively connected to the dispensing mechanism for each satellite vending machine; comprising the steps of:

allowing a user to accumulate a credit by insertion of a combination of at least one or more of bills, coins and tokens into said user interface of said master vending machine;

enabling the control mechanism to permit a user to make multiple selections;

allowing the user to make the selections from the master vending machine and the one or more satellite vending machines; and dispensing the multiple product selections at a special combination price.

* * * * *